United States Patent [19]

Sato et al.

[11] Patent Number: 4,591,948
[45] Date of Patent: May 27, 1986

[54] OIL-FILLED CAPACITOR

[75] Inventors: Atsushi Sato, Tokyo; Keiji Endo, Yokosuka; Shigenobu Kawakami, Ichikawa; Hideyuki Dohi, Tokyo, all of Japan

[73] Assignee: Nippon Petrochemicals Company, Limited, Tokyo, Japan

[21] Appl. No.: 762,931

[22] Filed: Aug. 6, 1985

[51] Int. Cl.$^4$ .......................... H01G 4/22; H01G 4/32
[52] U.S. Cl. .................................. 361/315; 252/567; 361/323
[58] Field of Search ........................ 252/567, 570, 571; 361/314, 315, 319, 323, 433 W, 433 E, 433 L

[56] References Cited

U.S. PATENT DOCUMENTS 4,348,713  9/1982  Grahame .............................. 361/315
4,355,346 10/1982  Gauger et al. ................... 361/315 X
4,548,745 10/1985  Yagitani et al. ..................... 252/567

Primary Examiner—Donald A. Griffin
Attorney, Agent, or Firm—Scully, Scott, Murphy & Presser

[57] ABSTRACT

An oil-filled capacitor which can be made small in size and has excellent electrical characteristics. The capacitor of the present invention is characterized in that it is made by impregnating a film-wound capacitor element with 1-phenyl-1-(benzylphenyl)ethane, at least a part of the dielectric material of said capacitor being made of a plastic film.

4 Claims, No Drawings

OIL-FILLED CAPACITOR

BACKGROUND OF THE INVENTION (1) Field of the Invention

This invention relates to a capacitor. More particularly, the invention relates to a new capacitor which is characterized in that at least a part of the dielectric material thereof is made of plastics and is impregnated with 1-phenyl-1-(benzylphenyl)ethane.

(2) Description of the Prior Art

In recent years, oil-filled capacitors are made small in size and durable to high voltages. With this tendency, various kinds of plastic materials have been used singly or together with the conventional insulating paper.

The plastic materials will be still more used as the component materials of oil-filled capacitors. In some instances, all of the conventional insulating paper was replaced by a plastic material. As the electrical insulating oil used for the electrical appliances in which a plastic material is used, the insulating oil must have compatibility with the plastic material. In other words, when an electrical insulating oil comes into contact with a plastic material, if the oil dissolves or swells the plastic material, the dielectric strength of electrical appliances will be impaired. In the case that the viscosity of electrical insulating oil is too high, the dielectric strength is also lowered owing to insufficient impregnation. Accordingly, it is necessary for the electrical insulating oil that it is well compatible with plastic materials and the viscosity of the insulating oil is low.

Meanwhile, metallized film capacitors (hereinafter referred to as "MF capacitors") are known in which a metal-deposited film that is made by vacuum-depositing a metal such as aluminum or zinc, is wound as an electrode. MF capacitors of this kind are used widely because they have self healing action and can be made small in sizes with high dielectric strength even when they are not provided with any insulating films interposed among layers of electrodes. Furthermore, biaxially stretched polypropylene film is widely used for these MF capacitors because it is not expensive as compared with other films such as polyester film, in addition, the temperature characteristic in dielectric loss can be made good.

The MF capacitors presently used are mainly the so-called dry-type ones in which any electrically insulative impregnating agent such as insulating oil is not used.

Generally not only in electric capacitors but also in other various electrical appliances, the potential gradient can be made high when electrodes or electric conductors are wholly surrounded by an electrically insulative impregnating agent. That is, it is advantageous because the dielectric strength of electrical appliances can be improved. Furthermore, if the impregnating agent is properly selected, the high-voltage withstanding property can be much improved.

Accordingly, the so-called oil-impregnated or oil-filled MF capacitors are more preferable than dry-type ones. However, when a metal-deposited film with a polypropylene base film is impregnated with an electrically insulative impregnating agent, the sizes of the film are changed or the impregnating agent permeates through the boundary between the base film and the vacuum-deposited metallic layer. Accordingly, the metallic layer is cracked, and what is worse, the metallic layer peels off resulting into dielectric breakdown. In addition, as the capacitor is impregnated with an impregnating agent after the film is wound, if the selection of impregnating agent is not adequately done, the impregnating agent cannot penetrate sufficiently into the clearances among film layers, from which aimed effect of impregnation cannot be expected.

In the dry-type capacitors, dielectric breakdown is often liable to occur in the marginal edges or peripheries of wound metallic layers. So that, the improvement in the dry-type MF capacitors is intended to some extent as semi-dry MF capacitors, by impregnating the edge and peripheral portions of wound film with an impregnating agent leaving internal portions unimpregnated.

There is, however, a limit in the improvement effect in the semi-dry MF capacitors of the above type because it is impregnated only partially and most portions of electrode layers are left unimpregnated, and it may not be denied that the semi-dry MF capacitors are not satisfactory as compared with fully impregnated capacitors. Accordingly, various MF capacitors of impregnated type have been proposed.

For example, proposed in Japanese Laid-Open Patent Publication No. 55-36972 is an impregnated MF capacitor in which the expansion rate of metallized film that was swollen by an impregnating agent is made 0.5% or less. In British Patent No. 1,451,499, an oil-filled capacitor is disclosed in which the percentage of change in length of polypropylene film owing to an insulating oil is not more than 0.5% at 80° C. and the diffusion quantity of the insulating oil into the polypropylene film is not more than 10% at 100° C., and this capacitor can be an MF capacitor.

However, the above-described MF capacitors do not always fit for practical uses.

In European Patent No. A1-104786 is disclosed a metal-deposited polypropylene film capacitor that is impregnated with 1,2-diarylethane.

As described above, several attempts to improve capacitors have been made in connection with their base films and impregnating oils, however, there has never been proposed any satisfactory capacitor.

BRIEF SUMMARY OF THE INVENTION

In view of the above-described conventional state of the art, it is the primary object of the present invention to provide an improved oil-filled capacitor which is free from the foregoing disadvantages in the conventional art.

Another object of the present invention is to provide an oil-filled capacitor, especially MF capacitor, which has excellent electrical characteristics.

That is, according to the present invention, the oil-filled capacitor is characterized in that the capacitor is made by winding, at least partially, a plastic film as a dielectric material and is impregnated with 1-phenyl-1-(benzylphenyl)ethane.

DETAILED DESCRIPTION OF THE INVENTION

In the present invention, the electrical insulating oil to be used for impregnating capacitors is 1-phenyl-1-(benzylphenyl)ethane (hereinafter referred to as "PBPE").

This PBPE has a lower viscosity and a lower pour point as compared with the conventionally known electrical insulating oil such as dibenzyltoluene likewise having three aromatic rings and the same number of carbon atoms. In addition, PBPE is excellent in compatibility with plastic materials because it scarcely swells or dissolves plastic materials, especially polyolefins such as polypropylene.

Even though the preparation method for PBPE is not limited, it is generally prepared by the following methods:

(1) Diphenylmethane is aralkylated with styrene at 100° to 200° C. in the presence of a silica-alumina catalyst.

(2) 1,1-Diphenylethane is aralkylated with benzyl chloride at 0° to 80° C. in the presence of iron chloride or aluminum chloride catalyst.

The oil-filled capacitor according to the present invention is made by winding a metal foil such as aluminum foil as an electrode and a plastic film together to obtain a capacitor element and it is then impregnated with an electrical insulating oil by the conventional method.

In the oil-filled capacitor of the present invention, the conventional insulating paper can be used together with a plastic film. As the plastics for the plastic films, there are polyolefins such as polyethylene, polypropylene and polymethylpentene, polyesters and polyvinylidene fluoride. Among them, the polyolefins are preferable and polypropylene is more preferable.

Among oil-filled capacitors, especially desirable capacitors are the above-mentioned MF capacitors in which the electrode is formed of the metal layer that is formed by vacuum-depositing a metal such as aluminum or zinc on a plastic film. The MF capacitor is made by winding a metallized plastic film and then impregnated with an electrical insulating oil according to the conventional method. The foregoing plastics can be employed as the materials for plastic films and polyolefin, especially polypropylene is suitable.

In the invention it is inevitable that the impregnating oil contains PBPE, however, it is possible to use the impregnating oil by mixing it at arbitrary ratio with one or more kinds of known electrical insulating oils such as refined mineral oils, polybutene, alkylbenzenes, diarylalkanes such as diphenylmethane, phenylxylylethane and phenylcumenylethane, alkylbiphenyls such as isopropylbiphenyl, alkylnaphthalenes such as diisopropylnaphthalene, triarylalkanes or triaryldialkanes such as trimer of styrene, distyrenated xylene and dibenzyltoluene, phthalic esters such as DOP, and animal or vegetable oils such as castor oil.

As described in the foregoing paragraph, the PBPE that is used for the oil-filled capacitor of the present invention has a lower viscosity and lower pour point as compared with the conventionally known electrical insulating oils such as dibenzyltoluene or the like. Furthermore, the PBPE scarcely swells or dissolves plastic materials, especially polyolefins such as polypropylene. Accordingly, the PBPE is excellent in impregnating property and in compatibility with plastic materials which facts make it possible to produce oil-filled capacitors that are excellent in durability and dielectric strength.

In the following, the present invention will be described in more detail with reference to examples.

EXAMPLE

To a reaction vessel were added 2500 g of 1,1-diphenylethane and 30 g of FeCl₃. Reaction was carried out by adding dropwise 500 g of benzyl chloride for 2 hours at room temperature. After the reaction, the catalyst was deactivated and 1280 g of 1-phenyl-1-(benzylphenyl)ethane was recovered by reduced pressure distillation.

The properties of the obtained product were as follows:

| | |
|---|---|
| Viscosity | 14.1 cSt (at 40° C.) |
| Pour point | −37.5° C. |
| Dielectric breakdown voltage | 70 kV/2.5 mm or above |
| Dielectric loss tangent (tan δ) | 0.001% (at 80° C.) |
| Specific volume resistivity (ρ) | $4.3 \times 10^{15}$ Ω · cm (at 80° C.) |
| Dielectric constant (ε) | 2.53 |

(Capacitor Test)

Aluminum was deposited on one side surface of a capacitor-use stretched polypropylene films by a usual vacuum deposition method to obtain a 40 mm wide metal-deposited film with 3 mm margins. Capacitor elements were made by winding this metal-deposited film and they were impregnated with the above insulating oil by an ordinary method to obtain MF capacitors of 5 μF in electrostatic capacity. This capacitors were then applied with various electric voltages to determine the times when half the number of capacitors were broken down. The results of this test are shown in the following Table 1.

COMPARATIVE EXAMPLE (Preparation of Dibenzyltoluene)

To a reaction vessel were added 2500 g of toluene and 50 g of FeCl₃ and reaction was carried out for 3 hours by adding 1500 g of benzyl chloride with stirring at room temperature. After the reaction, the catalyst was deactivated and 660 g of dibenzyltoluene was obtained.

The pour point of the dibenzyltoluene was −30° C. and the viscosity, 16.8 cSt at 40° C., which were inferior to those values of the insulating oil of the invention in the foregoing example.

The above dibenzyltoluene was impregnated into capacitor elements and they were subjected to the test of dielectric breakdown times in the like manner as example. The results of the test are shown in the following Table 1.

TABLE 1

| Potential Gradient (V/μ) | Breakdown Time (hours) | |
|---|---|---|
| | Example | Comp. Exam. |
| 90 | Above 500 | 350 |
| 100 | Above 500 | 120 |
| 110 | 323 | 85 |
| 120 | 108 | 11 |
| 130 | 35 | Broken within 10 minutes |

What is claimed is:

1. An oil-filled capacitor which is made by impregnating a film-wound capacitor element with 1-phenyl-1-(benzylphenyl)ethane, at least a part of the dielectric material of said capacitor element being made of a plastic film.

2. The oil-filled capacitor in claim 1, wherein said plastic film is a metallized plastic film.

3. The oil-filled capacitor in claim 1, wherein said plastic film is a polyolefin film.

4. The oil-filled capacitor in claim 3, wherein said polyolefin film is a polypropylene film.

* * * * *